(12) United States Patent
Hebb et al.

(10) Patent No.: US 6,587,463 B1
(45) Date of Patent: Jul. 1, 2003

(54) PACKET CLASSIFICATION ENGINE

(75) Inventors: Andrew T. Hebb, Hudson, MA (US); Sanjay G. Cherian, Brookline, NH (US)

(73) Assignee: Ascend Communications, Inc., Westford, MA (US)

( * ) Notice: Subject to any disclaimer, the term of this patent is extended or adjusted under 35 U.S.C. 154(b) by 0 days.

(21) Appl. No.: 09/459,448

(22) Filed: Dec. 13, 1999

(51) Int. Cl.[7] .................................................. H04L 12/28
(52) U.S. Cl. ....................................... 370/392; 370/400
(58) Field of Search ............................... 370/389, 392, 370/401, 402, 403, 400

(56) References Cited

U.S. PATENT DOCUMENTS 5,999,530 A * 12/1999 LeMaire et al. ............ 370/401
6,041,053 A *  3/2000 Douceur et al. ............ 370/389

* cited by examiner

*Primary Examiner*—Chau Nguyen
*Assistant Examiner*—Scott Waite

(57) ABSTRACT

Packet classification apparatus includes a rule memory and a criterion memory. One type of rule memory entry contains an operator and a pointer to a criterion memory entry. The operator defines a comparison operation to be performed, such as EQUAL (exact match) or LESS THAN. The criterion memory entry contains one or more values to be used as comparands on one side of the comparison, where corresponding values from a received packet appear on the other side of the comparison. Control logic responds to packet classification requests to retrieve a rule memory entry from the rule memory, retrieve the criterion memory entry identified by the criterion memory pointer in the rule memory entry, and perform the operation specified by the operator in the rule memory entry on the values in the criterion memory entry and corresponding values included in the classification request. This procedure is repeated for a sequence of rule memory entries until an ending condition is encountered, whereupon a packet classification result is generated reflecting the result of the classification operations. This result is provided to a packet processor to take the appropriate action based on the classification result.

18 Claims, 11 Drawing Sheets

| Word | 63 | 62 | 61 | 60 56 | 55 48 | 47 40 | 39 32 | 31 16 | 15 0 |
|---|---|---|---|---|---|---|---|---|---|
| 0 | Type (1) | Ind. (1) | Res. (1) | Order (5) | RLE Ptr. (24) | | | PCE Root 0 (16) | PCE Root 1 (16) |
| 1 | 0 | Req. ID (7) | | | IP TOS (8) | IP Protocol (8) | TCP Flags (8) | IP Source Address (32) | |
| 2 | IP Destination Address (32) | | | | | | | TCP/UDP Source Port (16) | TCP/UDP Destination Port (16) |
| 3 | Reserved (64) | | | | | | | | |

*FIG. 6*

| 63 | 62 56 | 55 | 54 | 53 | 52 | 51 48 | 47 | 46 38 | 37 24 | 23 16 | 15 0 |
|---|---|---|---|---|---|---|---|---|---|---|---|
| T (1) | Req. ID (7) | P (1) | I (1) | L (1) | E (1) | Z (4) | R1-M (1) | Depth (9) | PCE match address (14) | RLE flags (8) | RLE Next Hop Pointer (16) |

*FIG. 7*

| 63 | 62 59 | 58 54 | 53 49 | 48 44 | 43 38 |
|---|---|---|---|---|---|
| T (1) | Zero | TX message | RCE results | RCE request | Tx - 0 |

| 37 32 | 31 24 | 23 18 | 17 12 | 11 6 | 5 0 |
|---|---|---|---|---|---|
| Tx - 1 | Zero | Hi - 0 | Hi - 1 | Lo - 0 | Lo - 1 |

*FIG. 8*

| 38 | 37 - 0 |
|---|---|
| TYPE | OPERATOR/POINTER |

0 : DONE (37)
CARRY (36)
CRITERION OPERATORS (35-12)
CRITERION ADDRESS (11-0)

1 : RULE ADDRESS (13-0)

*FIG. 10*

| 37 | 36 - 32 | 31 - 0 |
|---|---|---|
| CONFIG | MASK | SA/DA |

0 :   MASK               SA
1 :   MASK               DA

*FIG. 11*

| 46 - 45 | 44 - 37 | 36 - 32 | 31 - 0 |
|---|---|---|---|
| CONFIG | PTCL | MASK | SA/DA/SP/DP |

0 :   PTCL   SA MASK      SA
1 :   PTCL   DA MASK      DA
2 :   PTCL      -         SP (31-16), DP (15-0)
3 :   PTCL      -         SP (31-16), DP (15-0)

*FIG. 12*

| 50 - 48 | 47 - 40 | 39 - 32 | 31 - 0 |
|---|---|---|---|
| CONFIG | PTCL/MASK | MASK/TOS | SA/DA/SP/DP/FLAGS |

| | | | |
|---|---|---|---|
| 0 : | PTCL | SA MASK (36 - 32) | SA |
| 1 : | PTCL | DA MASK (36 - 32) | DA |
| 2 : | PTCL | TOS | SP (31-16), DP (15-0) |
| 3 : | TOS MASK | TOS | SP (31-16), DP (15-0) |
| 4 : | TOS MASK | TOS | FLGS MSK (31 - 24), FLAGS (23-16), DP (15-0) |
| 5 : | TOS MASK | TOS | FLGS MSK (31 - 24), FLAGS (23-16), DP (15-0) |
| 6 : | TOS MASK | TOS | FLGS MSK (31 - 24), FLAGS (23-16), DP (15-0) |
| 7 : | TOS MASK | TOS | FLGS MSK (31 - 24), FLAGS (23-16), DP (15-0) |

*FIG. 13*

PACKET CLASSIFICATION ENGINE

CROSS REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

The present invention is related to the field of data communication networks.

In data communication networks, network devices such as switches are used to route packets through the network. Each switch typically has a number of line interfaces, each connected to a different network segment. When a packet is received at a given line interface, forwarding logic determines which line interface the packet should be transmitted from, and the packet is transferred to the appropriate outgoing line interface to be sent toward its destination in the network.

It is known to perform packet filtering in network devices such as switches. Packet filtering can be used to achieve various network management goals, such as traffic monitoring and security goals. Filtering criteria are established by network administrators, and provided to the switches or other devices that carry out the filtering operation. Packets received by the switches are examined to determine whether their characteristics match the criteria for any of the established filters. For packets that satisfy the criteria for one or more filters, predetermined actions associated with those filters are carried out. For example, under certain circumstances it may be desirable that packets originating from a given network node be discarded rather than being forwarded in the network. A filter can be defined in which the criterion is that a packet source address exactly match a specific value, which is the address of the node whose packets are to be discarded. The action associated with the filter is the discarding of the packet. When a packet is received whose source address satisfies this criterion, it is discarded rather than being forwarded in the normal fashion.

There are a number of different kinds of criteria that may be used to filter packets. These criteria include exact matches as well as range checking, i.e., checking whether a value in a packet falls in some range of values. Numerous packet parameters can be used as criteria, such as source address, destination address, port identifiers, type of service, and others. To be useful, packet filtering processes must allow filters to be flexibly defined using different combinations of these and other criteria.

Because of this complexity inherent in packet filtering, it has traditionally been performed largely or exclusively in software within switches or other network devices supporting packet filtering. Software-based filtering, however, presents a bottleneck when high packet forwarding performance is required. Network administrators have had to make undesirable tradeoffs between network responsiveness and network security, for example, because previous systems have not been capable of robust packet filtering at line rates.

BRIEF SUMMARY OF THE INVENTION

In accordance with the present invention, packet processing logic in a network device is disclosed that provides high-speed packet classification for packet filtering purposes. The architecture of the classification apparatus provides substantial flexibility in the definition of complex filter criteria. Robust filtering can be performed at a sufficiently high rate to avoid degrading packet forwarding performance.

The packet classification apparatus includes a rule memory and a criterion memory. One type of rule memory entry contains an operator and a pointer to a criterion memory entry. The operator defines a comparison operation to be performed, such as EQUAL (exact match) or LESS THAN. The criterion memory entry contains one or more values to be used as comparands on one side of the comparison, where corresponding values from a received packet appear on the other side of the comparison. For example, one comparand from criterion memory may represent a source address. This value is compared with the value appearing in the source address field of received packets.

Control logic responds to packet classification requests to retrieve a rule memory entry from the rule memory, retrieve the criterion memory entry identified by the criterion memory pointer in the rule memory entry, and perform the operation specified by the operator in the rule memory entry on the values in the criterion memory entry and corresponding values included in the classification request. This procedure is repeated for a sequence of rule memory entries until a certain ending condition is encountered, whereupon a packet classification result is generated reflecting the result of the classification operations. This result is provided to a packet processor to take the appropriate action based on the classification result.

Other aspects, features, and advantages of the present invention are disclosed in the detailed description that follows.

BRIEF DESCRIPTION OF THE SEVERAL VIEWS OF THE DRAWING

FIG. 6 is a diagram of the structure of a route and classification request passed to the route and classification engine of FIG. 5;

FIG. 7 is a diagram of the structure of a route and classification result provided by the route and classification engine of FIG. 5;

FIG. 8 is a diagram of the structure of a status indication provided by the route and classification engine of FIG. 5;

FIG. 10 is a diagram of the structure of entries in a rule memory in the packet classification engine of FIG. 9;

FIG. 11 is a diagram of the structure of entries in a first criterion memory in the packet classification engine of FIG. 9;

FIG. 12 is a diagram of the structure of entries in a second criterion memory in the packet classification engine of FIG. 9;

FIG. 13 is a diagram of the structure of entries in a third criterion memory in the packet classification engine of FIG. 9;

DETAILED DESCRIPTION OF THE INVENTION

Figure 1:
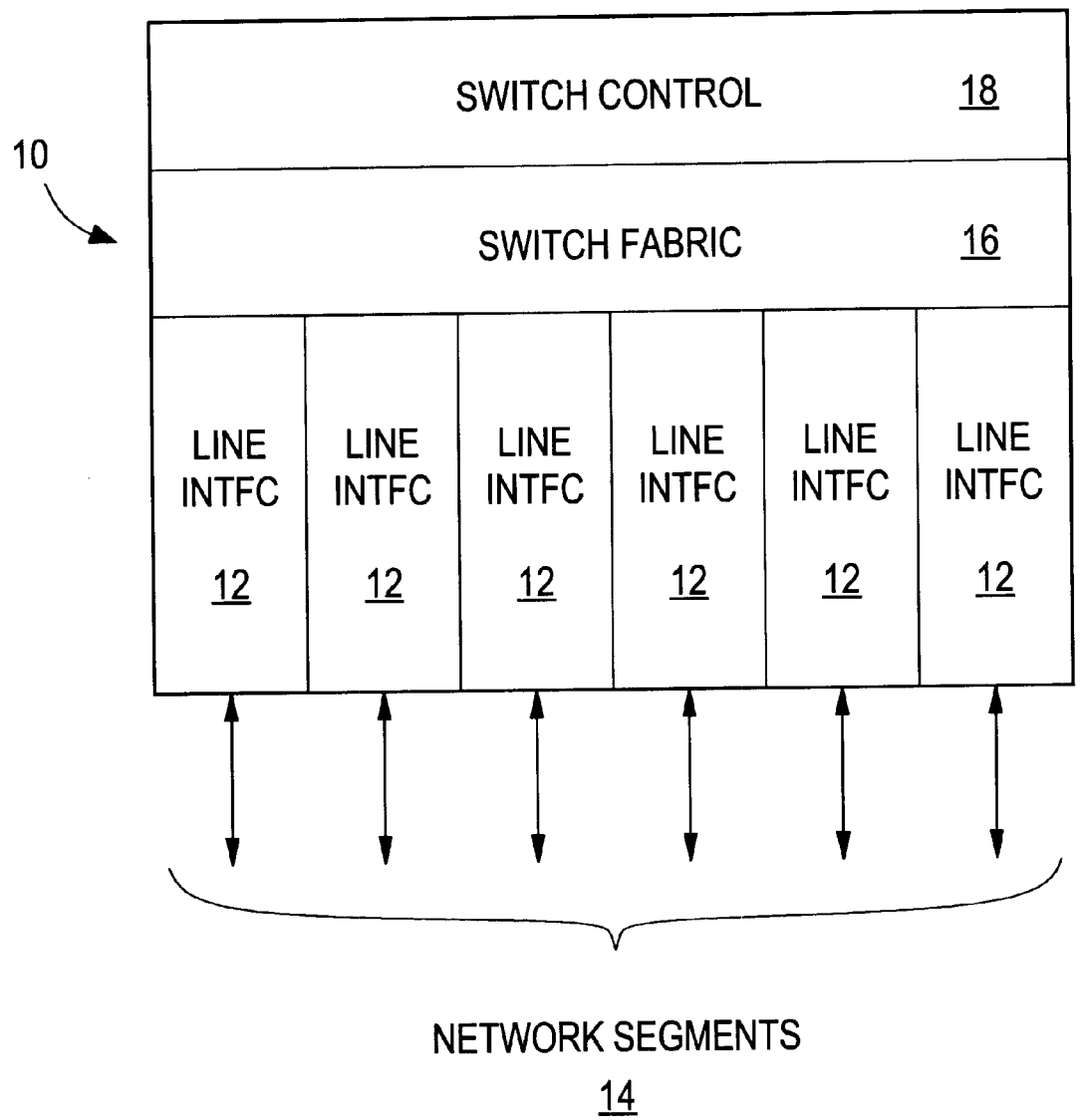
FIG. 1 is a block diagram of a network switch incorporating a packet classification engine in accordance with the present invention.

In FIG. 1, a network switch 10 is shown as including a number of line interfaces 12 connected to respective network segments 14. The line interfaces 12 are connected to a switch fabric 16 used to provide connections among the line interfaces 12 for packet forwarding. The overall operation of the switch 10, including the dynamic configuration of the switch fabric 16, is controlled by a switch control 18. In general, the various network segments 14 may be of different types. For example, certain of the network segments 14 may be optical links operating at any of a variety of standard signalling rates, such as OC-3/STM-1 and OC-12/STM-4. Others of the network segments 14 may be non-optical links employing coaxial cable, for example, and carrying signals of different formats.

Each line interface 12 is of course designed for operation with the specific type of network segment 14 to which it connects. The primary tasks of each line interface 12 are to transfer packets or frames received from an attached network segment 14 to another line interface 12 via the switch fabric 16 for forwarding on a network segment 14 attached to the other line interface 12, and to receive packets from the other line interfaces 12 via the switch fabric 16 for forwarding on the attached network segment 14.

Figure 2:
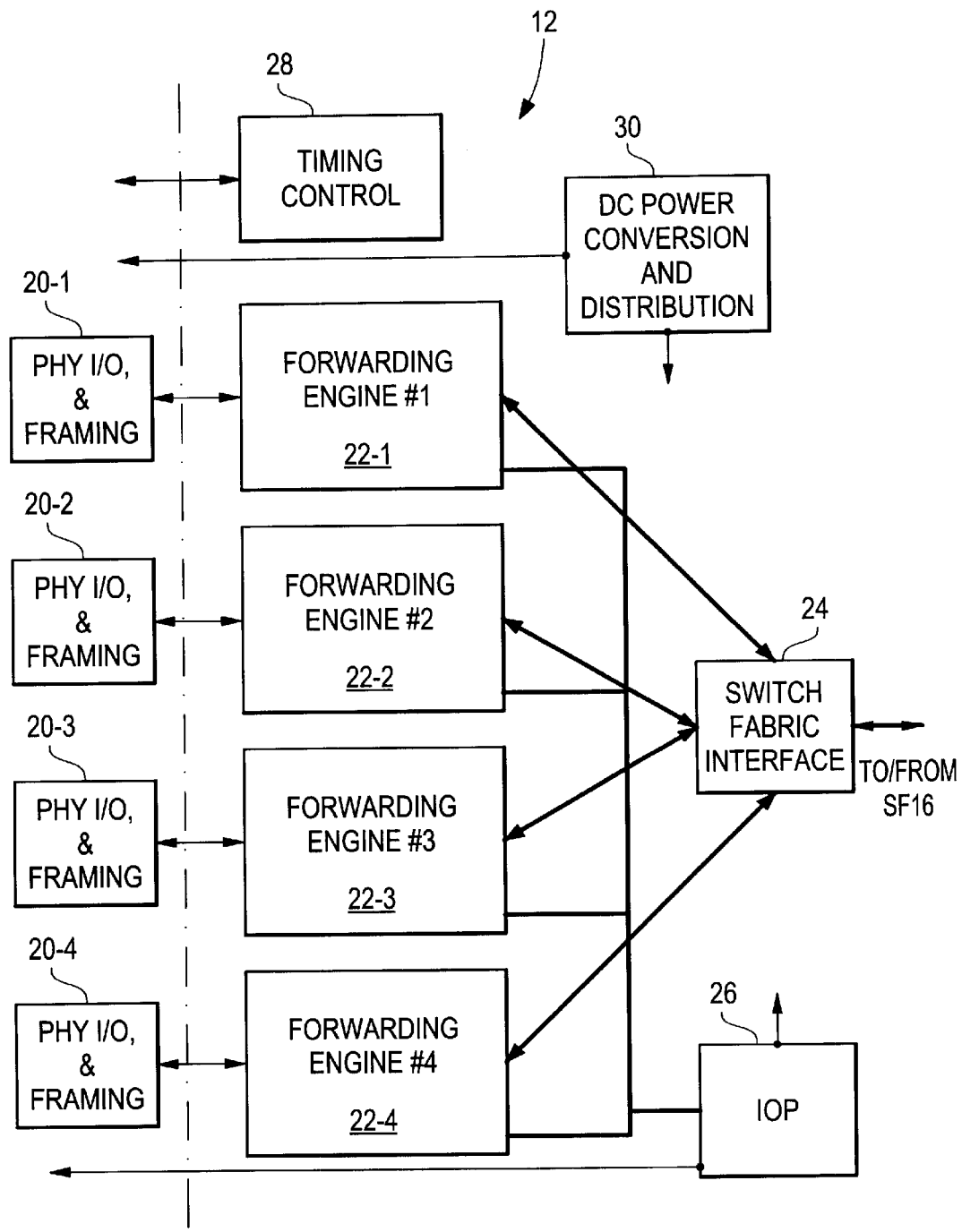
FIG. 2 is a block diagram of a line interface in the network switch of FIG. 1.

FIG. 2 shows the structure of one type of line interface 12. This interface contains four separate optical interface ports, each including physical input/output and framing circuitry 20 and a forwarding engine 22. The forwarding engines 22 are all connected to switch fabric interface logic 24, which interfaces with the switch fabric 16 of FIG. 1. The forwarding engines also interface with a line interface I/O processor (IOP) 26. Timing control logic 28 and DC power circuitry 30 are also included.

Each forwarding engine 22 provides a bidirectional data path between a connected physical I/O block 20 and the switch fabric interface 24. Received packets are segmented into multiple fixed-size ATM-like cells for transfer through the switch fabric 16 of FIG. 1 to another line interface 12. Cells received from the switch fabric 16 via the switch fabric interface 24 are reassembled into packets for outgoing transfer to the connected physical I/O block 20.

The IOP 26 is a general-purpose processor that performs background functions, i.e. functions that support the forwarding of packets that are not carried out on a per-packet basis. One function performed by the IOP 26 is receiving packet forwarding information and packet filtering information from the switch control 18 of FIG. 1, and distributing the information to the forwarding engines 22. This process is described below.

Figure 3:
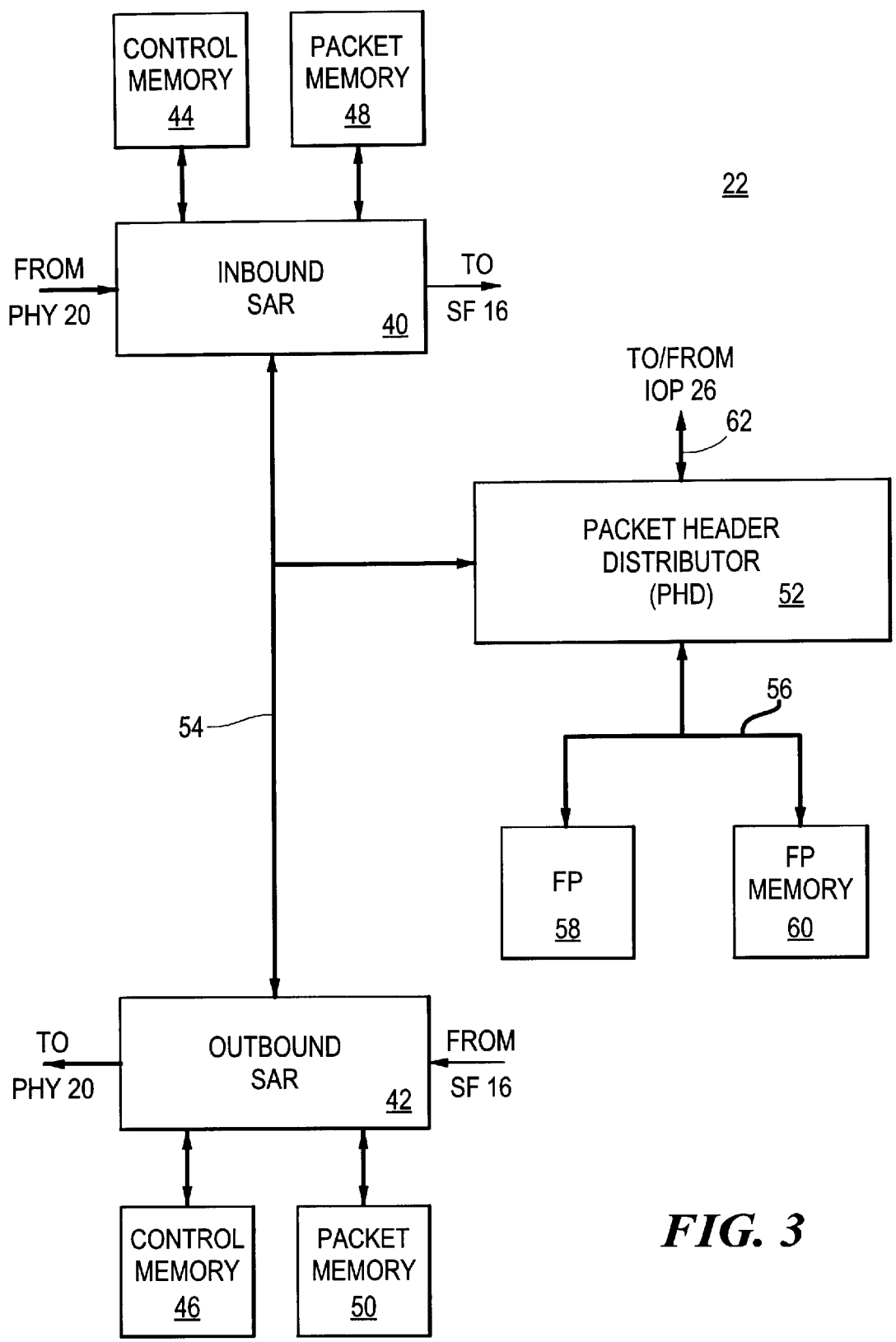
FIG. 3 is a block diagram of a packet forwarding engine on the line interface of FIG. 2.

FIG. 3 shows a block diagram of a forwarding engine 22. An inbound segmentation-and-reassembly (SAR) logic block 40 provides a data path from a physical I/O block 20 to the switch fabric 16 of FIG. 2, and an outbound SAR logic block 42 provides a data path from the switch fabric 16 to the respective physical I/O block 20. Each SAR 40, 42 is coupled to a respective control memory 44, 46 and packet memory 48, 50 used in performing the segmentation or reassembly function.

The SAR devices 40 and 42 are both connected to a packet header distributor (PHD) application-specific integrated circuit (ASIC) 52 via a 64-bit PCI bus 54. As described in more detail below, the PHD ASIC 52 provides FIFO queue interfaces between the PCI bus 54 and a separate 64-bit bus 56. The bus 56 connects the PHD ASIC 52 with a forwarding processor (FP) 58 and forwarding processor memory 60. The PHD ASIC 52 is also connected to the IOP 26 of FIG. 2 by a separate bus 62.

Figure 4:
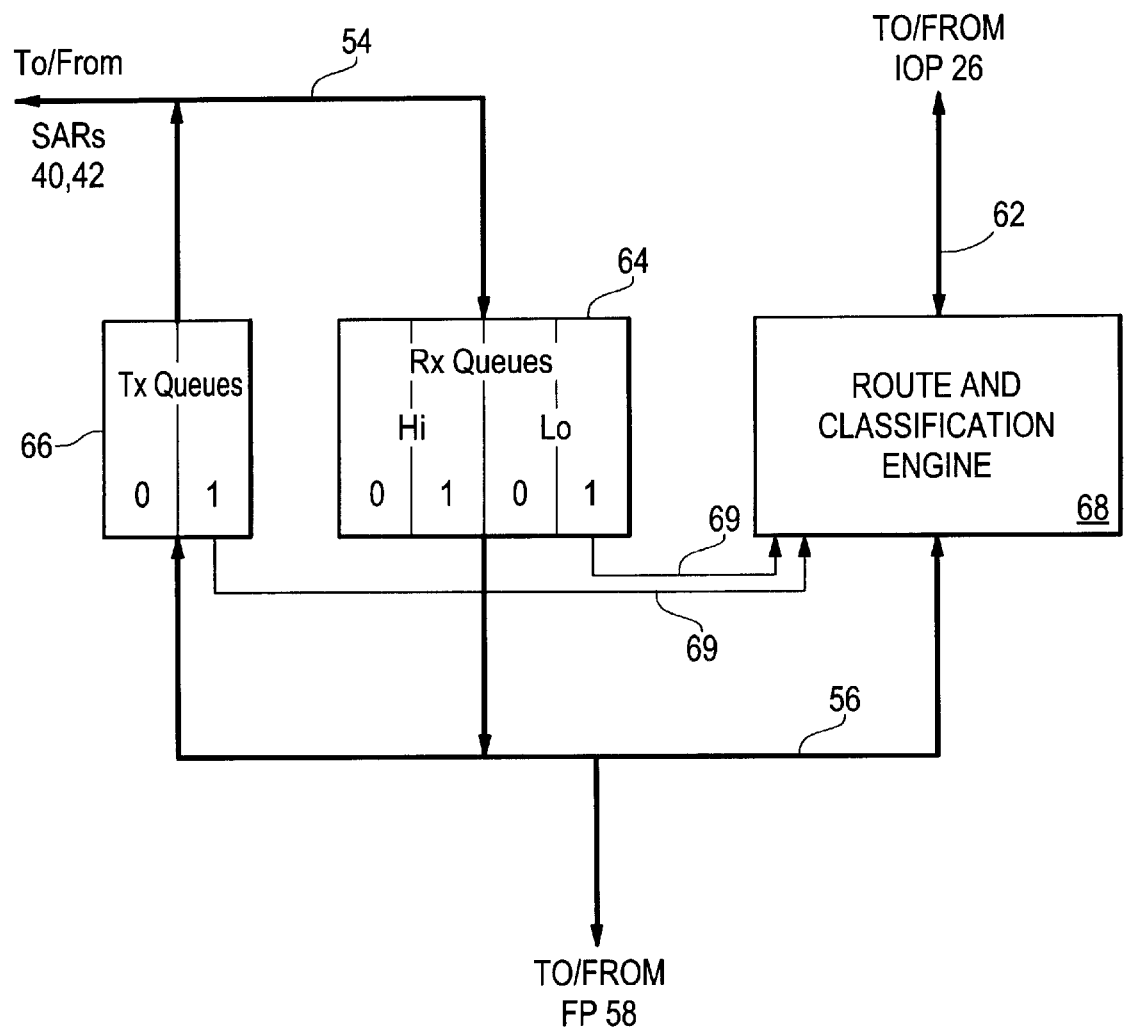
FIG. 4 is a block diagram of a packet header distributor application-specific integrated circuit (ASIC) in the forwarding engine of FIG. 3.

FIG. 4 shows the structure of the PHD 52 of FIG. 3. A set of receive queues or RX queues 64 is used for temporary buffering of packet headers and other messages bound for the FP 58. As shown, there are four RX queues 64, two queues for high-priority traffic and two queues for low-priority traffic. An example of high-priority traffic is traffic having a high Quality of Service (QOS) guarantee, such as a committed rate. Low-priority traffic is traffic having a lower QOS or no QOS guarantee, such as best-efforts. For each priority level, there is one queue (labeled "0") for traffic originating from the inbound SAR 40, and another queue (labeled "1") for traffic originating from the outbound SAR 42. A set of transmit queues or TX queues 66 is used for temporary buffering of packet headers and other messages bound for the SARs 40, 42 from the FP 58. A route and classification engine 68 performs a route lookup and various packet filtering checks on behalf of the FP 58. The packet filtering operation is described below. The route and classification engine 68 receives status information from the queues 64, 66 via signal lines 69, and makes this information available to the FP 58 in a manner described below.

The overall operation of a forwarding engine 22 will be described with reference to FIG. 3 and FIG. 4. Packets are received by the inbound SAR 40 from the associated physical-layer circuitry 20 of FIG. 2, and are stored in the packet memory 48. The inbound SAR 40 transfers the packet headers to an appropriate one of the RX queues 64 in the PHD 52. The FP 58 polls the PHD 52 to determine queue status, and retrieves the packet headers from the RX queues 64 as appropriate. As part of the header processing, the FP 58 sends certain information elements from each header to the route and classification engine 68 in a route and classification request. The route and classification engine 68 performs a route lookup and various packet filtering checks against the header elements in the request, and places the results of these checks into a result queue (described below). The FP 58 obtains the route lookup and classification results from the result queue, and uses these results to create a new header for the packet. The new header is transferred back to the PHD 52 via one of the TX queues 66, along with information identifying the internal circuit on which the packet should be forwarded after segmentation. The inbound SAR 40 retrieves the new header, places it in the packet memory 48 with the payload portion of the received packet, segments the new packet and transfers the resulting cells to the switch fabric 16 of FIG. 1 on the internal circuit specified by the FP 58.

In the outbound direction, the outbound SAR 42 receives packets from the switch fabric 16 of FIG. 1, and reassembles these packets into the packet memory 50. Packet headers are sent to the PHD 52, and retrieved from the PHD 52 by the FP 58. For most packets, the route lookup and filtering checks will have already been performed during inbound processing, so these operations are not repeated. Some protocols, however, do require lookups and filtering for both inbound and outbound packets, and therefore these operations are optionally performed by the FP 58 in conjunction with the route and classification engine 68. If appropriate, the FP 58 formulates a new header for the packet, based in part on the identity of the internal circuit on which the segmented outbound packet is received. This new header is written to the PHD 52, along with transmit circuit information. The PHD 52 transfers the new header to the outbound SAR 42. The outbound SAR 42 places the new header in the packet memory 50 along with the packet payload, and transmits the packet to the associated physical layer interface 20 of FIG. 2.

Figure 5:
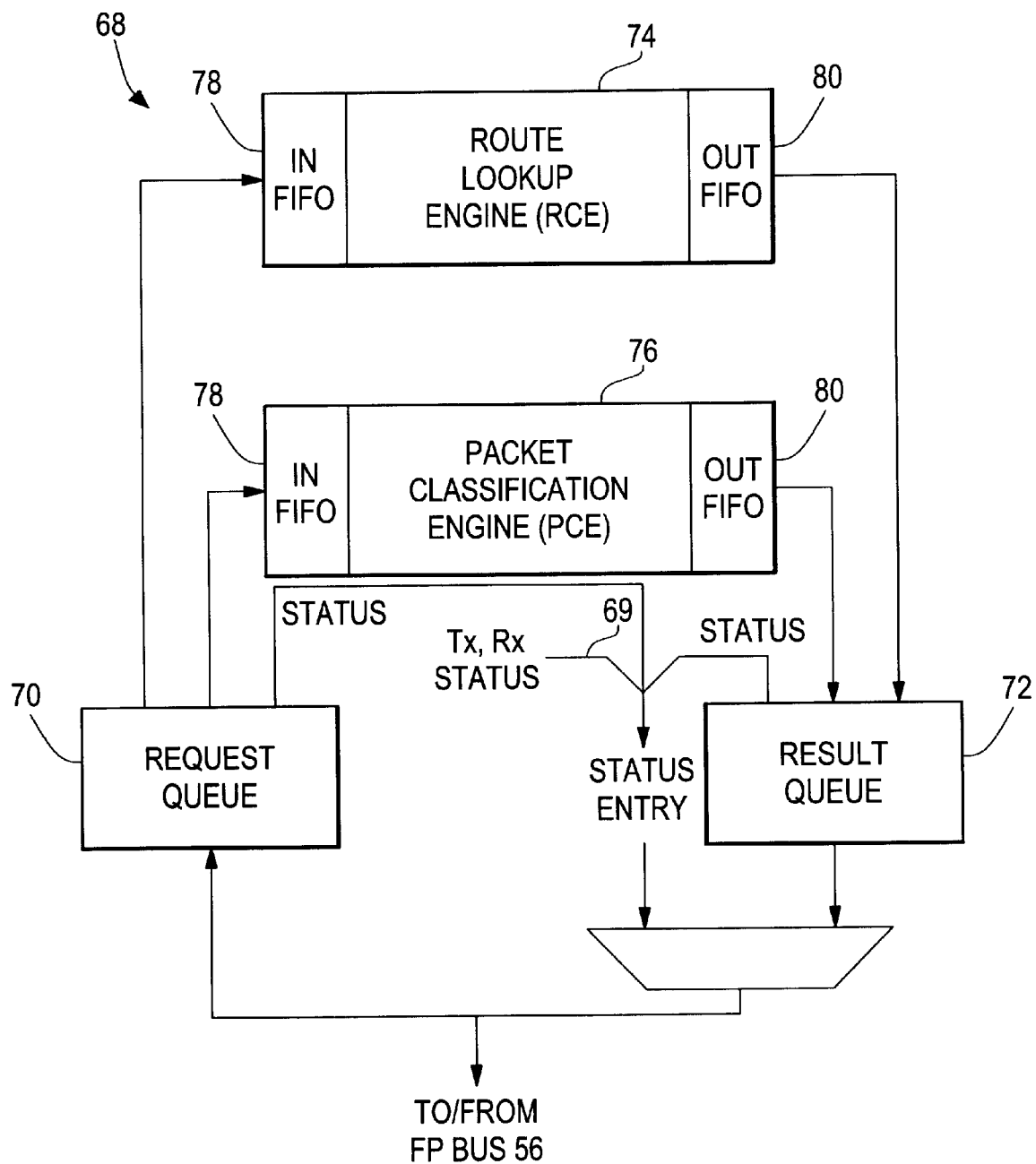
FIG. 5 is a block diagram of a route and classification engine in the packet header distributor ASIC of FIG. 4.

FIG. 5 shows the structure of the route and classification engine 68. Requests from the FP 58 of FIG. 3 are placed into a single request queue 70, and results are returned in a single result queue 72. Each queue 70 and 72 holds up to 16 request/result entries. A route lookup engine (RLE) 74 performs route lookups, typically based on a destination address (DA) included in the header. A packet classification engine (PCE) 76 performs packet filtering checks, based on specified information included in the packet header. The operation of the PCE 76 is described in more detail below. Input FIFO buffers 78 are placed between the request queue 70 and the RLE 74 and PCE 76, and output FIFO buffers 80 are placed between the RLE 74 and PCE 76 and the result queue 72. The FIFOs 78 and 80 provide a measure of decoupling between the processing performed by the RLE 74 and the processing performed by the PCE 76. A multiplexer 81 enables the FP 58 to read either the result queue 72, or status information including status from the request queue 70, the result queue 72, and the status appearing on the signal lines 69 of FIG. 4. The structure of these entries is described below.

FIG. 6 shows the structure of the route and classification request that is passed to the PCE 76 and RLE 74 via the request queue 70 of FIG. 5. The size of the request is four 64-bit words. The various fields are defined as follows:

| FIELD NAME | DESCRIPTION |
| --- | --- |
| Type | RLE Entry type: 0 = Node, 1 = Leaf |
| Ind. | RLE Indirect route: 1 = Indirect, 0 = Direct |
| Res. | Unused reserved bit |
| Order | No. of DA bits to add to RLE pointer |
| RLE Ptr. | Base address of RLE entry to which DA is added (based on Order) |
| PCE Root 0 | Starting address for PCE rule 0 |
| PCE Root 1 | Starting address for PCE rule 1 |
| 0 | Set to zero, used for alignment checking |
| Req. ID | Request identifier, copied to result to enable matching with request |
| IP TOS | The contents of the Type of Service (TOS) field of the received packet |
| IP Protocol | The contents of the Protocol field of the received packet |
| TCP Flags | The contents of the TCP Flags field of the received packet |
| IP Source Address | The IP Source Address of the received packet |
| IP Dest. Addr. | The IP Destination Address of the received packet |
| TCP/UDP Source Port | The identifier of the TCP/UDP port on which the packet was received |
| TCP/UDP Dest. Port | The identifier of the TCP/UDP port for which the received packet is destined |
| Reserved | Unused reserved bits |

As shown in the above table, there is a provision for two separate sets of classification checks, one beginning at an address labeled "PCE Root 0" and the other as "PCE Root 1". The significance of these separate starting addresses is described below.

As previously noted, the appropriate fields of the request are provided to the respective input FIFOs 78 for the RLE 74 and PCE 76 of FIG. 5. Some of the fields, such as the Req. ID and the IP Dest. Addr., are provided to both the RLE 74 and the PCE 76. Other fields are provided to only one or the other. The use of the fields routed to the PCE in particular is described below.

FIG. 7 and FIG. 8 show the respective structures of the two different types of entries that are read from the route and classification engine 68 of FIG. 4. FIG. 7 shows a result entry, which is obtained from the result queue 72 of FIG. 5 and conveys the result of a classification search. FIG. 8 shows a status entry used to convey status information to the FP 58 of FIG. 3.

The fields of the result entry shown in FIG. 7 are defined as follows:

| FIELD NAME | DESCRIPTION |
| --- | --- |
| T | Type: 0 = PCE Result, 1 = PCE Status |
| Req. ID | Request Identifier (from the request) |
| P | PCE Match NOT Found: 0 = Match Found, 1 = Match NOT Found |
| I | RLE Indirect Route: 0 = Normal, 1 = Indirect |
| L | RLE Long Search: 0 = Short, 1 = Long |
| E | Error indicator: 0 = Normal, 1 = Error |
| Z | Zero padding |
| R1-M | Match in PCE Root 1 (valid only if P = 0): 0 = Match in root 0, 1 = Match in root 1 |
| Depth | Depth of route lookup search |
| PCE Match Addr. | Address of last rule checked in PCE |
| RLE Flags | Flags from RLE table entry |
| RLE Next Hop Ptr. | Pointer from RLE table entry |

The fields of the status entry shown in FIG. 8 are defined as follows:

| FIELD NAME | DESCRIPTION |
| --- | --- |
| Zero | Unused, set to zero |
| TX Message | Remaining space in forwarding-processor-to-IOP message queue |
| RCE Results | Number of pending entries in result queue 72. Normally zero, because status inserted only when queue is empty. |
| RCE Requests | Number of empty entries in request queue 70 |
| Tx-0 | Number of empty entries in TX queues 66. |
| Tx-1 | |
| Hi-0 | |

-continued

| FIELD NAME | DESCRIPTION |
|---|---|
| Hi-1<br>Lo-0<br>Lo-1 | Number of empty entries in RX queues 64. |

The general operation of the route and classification engine 68 will be described with reference to FIG. 5 through FIG. 8. The FP 58 of FIG. 3 writes lookup and classification requests to the request queue 70. When a request reaches the front of the request queue 70, different information elements from the request are written simultaneously into the respective input FIFOs 78 for the RLE 74 and the PCE 76. The RLE 74 and PCE 76 operate on the separate pieces of each request independently, and in general finish their respective processing operations for a given request at different times. The results of these operations are written to the output FIFOs 80. When both sets of results for a given packet have reached the front of the output FIFOs 80, a single combined result is written to the result queue 72. The combined results are read by the FP 58 and used to formulate new packet headers and circuit information for the SARs 40 and 42 of FIG. 3, as discussed above.

More particularly, the FP 68 uses the route and classification engine 68 in a batch fashion. When there is sufficient room in the request queue 70, a burst of requests are written. Respective portions of each request are handled by the PCE 76 and RLE 74, as previously mentioned. The FP obtains results by issuing a read command to the RCE 68. For each read, a block of four 64-bit entries are returned to the FP 58 via the FP bus 56. Each block contains as many results from the result queue 72 as are available at the time of the read, and a number of status entries as padding. Thus, one of five different combinations of entries in a result block may be read:

1. 4 result entries
2. 3 result entries followed by 1 status entry
3. 2 result entries followed by 2 status entries
4. 1 result entry followed by 3 status entries
5. 4 status entries The FP 58 will generally issue read commands until the result queue 72 is empty, which is inferred whenever one or more status entries are included in the result block. The FP 58 then uses these results while the route and classification engine 68 processes the next batch of requests. The FP 58 uses the status information to manage the flow of requests, so that the RLE 74 and PCE 76 are kept busy and the queues 70 and 72 and FIFOs 78 and 80 are prevented from overflowing.

It will be noted that in the illustrated embodiment, there is only one status entry that can be read, and the multiple status entries in a result block represent multiple reads of this single entry. In alternative embodiments it may be useful to provide additional, lower-priority information in the second through fourth status entries, for example for statistics gathering purposes or other background processing.

One significant advantage of appending status information to results is improved efficiency in using the FP bus 56. Whenever the FP 58 issues a read for results, either useful results or useful status information is returned. Additionally, the result block is returned in burst fashion, so that overhead associated with reading is reduced. Also, the FP 58 obtains information about the queues around the RLE 74 and PCE 76, and about the RX queues 64 and TX queues 66, in a single read transaction.

Figure 9:
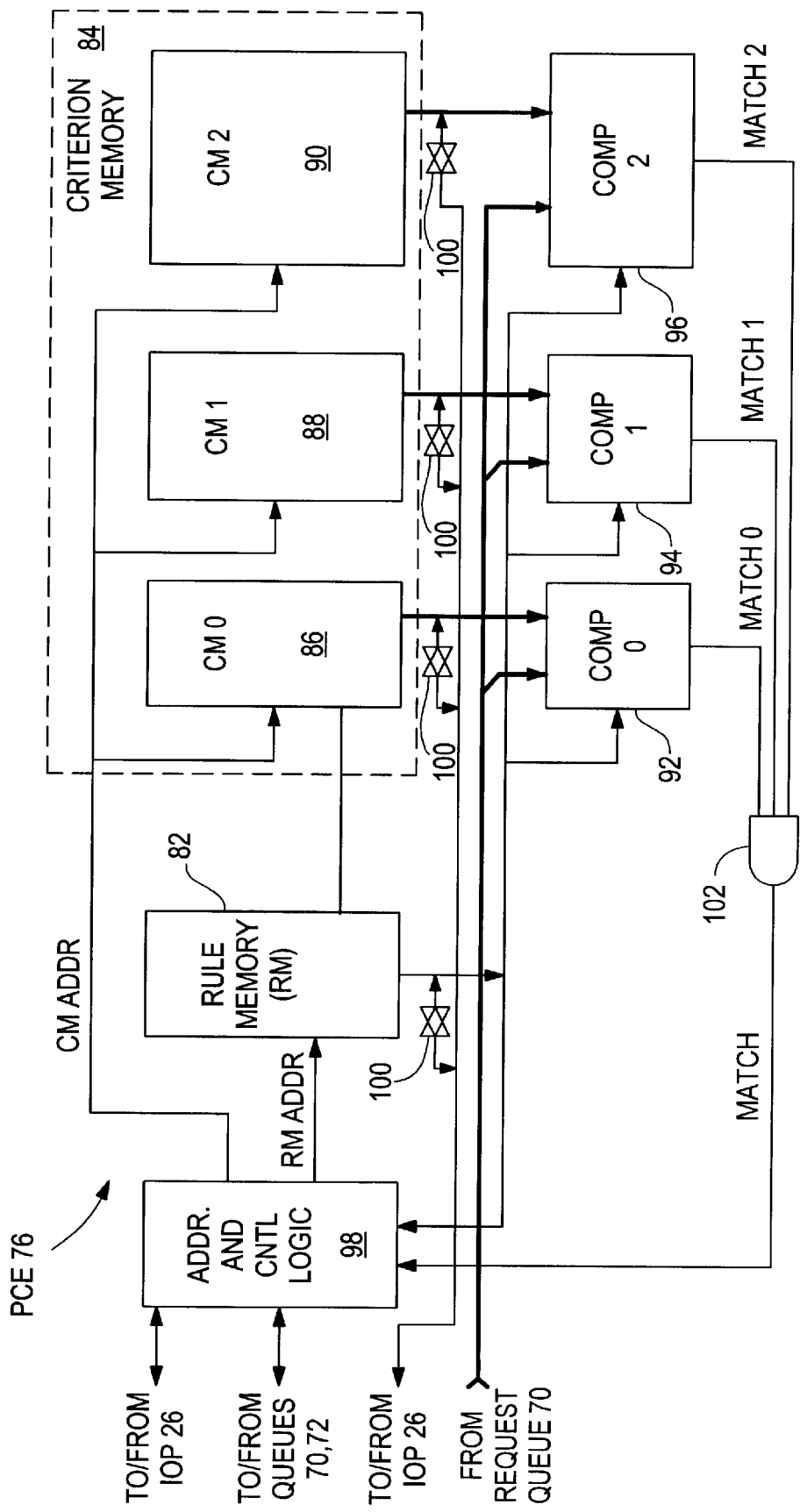
FIG. 9 is a block diagram of a packet classification engine (PCE) in the route and classification engine of FIG. 5.

FIG. 9 shows the structure of the PCE 76 of FIG. 5. Data representing filters and bindings (discussed below) are stored in a rule memory (RM) 82 and a criterion memory (CM) 84. The CM 84 includes three commonly addressed memories CM0 86, CM1 88 and CM2 90. Three comparison logic blocks 92, 94 and 96 are associated with respective ones of the criterion memories 86, 88 and 90. Addressing and control logic 98 decodes requests received from the request queue 70 of FIG. 5, generates addresses for the RM 82 and the CM 84, sequences through multiple rules as required by each request, and generates results that are passed back to the result queue 72 of FIG. 5. The addressing and control logic 98 also interfaces to the IOP 26 of FIG. 2 to enable the reading and writing of the RM 82 and CM 84 by the IOP 26. Bus transceivers 100 provide the necessary data path between the IOP 26 and the RM 82 and CM 84. An AND gate 102 provides a single MATCH signal when corresponding MATCHn outputs from the comparison logic blocks 92, 94 and 96 are all true.

Rule sets for packet filtering are typically originated by a Network Management Station (NMS), but can also be dynamically assigned by the FP 58 based on identified flows. Part or all of the following information is provided by the NMS or FP 58 for filters: IP Destination Address with mask; IP Source Address with mask; IP protocol identifier; TCP/UDP Source Port and Destination Port identifiers; IP Type of Service identifier and mask, and miscellaneous flags. The various information elements from a filter are compared with corresponding elements from each received packet in order to determine whether the packet matches the filter criteria. If so, some specific action for the filter is taken, such as intentionally discarding a packet. If not, some default action is typically taken, such as allowing the packet to proceed toward its destination.

Traditionally, packet filters are represented as an ordered list of comparison sets that are searched linearly. In the PCE 76, the filter elements are divided into criteria (the comparison values) and rules (the list itself and the operators to be used for each comparison). This separation of rules and criteria is reflected in the use of separate rule memory (RM) 82 and criterion memory (CM) 84. The memories 82 and 84 are separately optimized for their respective functions, thus enhancing efficiency and performance. Also, entries within the CM 84 can be referred to by multiple rules in the RM 82, further enhancing storage efficiency.

The RM 82 contains an array of rule memory entries, each of which may be one of two types. A first type contains a set of operators and a pointer to a row of CM 84 that stores comparands for a corresponding filter. A second type contains a pointer to another rule memory entry. These entries are used to perform jumps between non-contiguous segments in a set of rules being searched sequentially. In the illustrated embodiment, the RM 82 can contain up to 16K entries.

The CM 84 is segmented into three separate memories CM0 86, CM1 88 and CM2 90, each of which can contain up to 4K entries in the illustrated embodiment. The organization of the CM 84 exploits a hierarchy that is inherent in IP packet classification. Because filtering on certain fields is usually accompanied by filtering based on other fields as well, it is reasonable to restrict which fields are stored in the separate memories CM0, CM1, and CM2. These restrictions further enhance storage efficiency. The most commonly filtered fields, Source Address and Destination Address, are supported in all three memories CM0 86, CM1 88 and CM2 90. As described below, other fields are supported only in CM1 88 and/or CM2 90. This architecture maximizes the flexibility with which space in the CM 84 can be allocated, while at the same time enabling powerful parallel searches. The structure and use of CM 84 are described in more detail below.

FIG. 10 shows the structure of the entries in the RM 82 of FIG. 9, which are also referred to as rule memory entries. Each 39-bit entry has a 1-bit Type field. If this field is 1, then bits 13-0 of the entry contain a pointer to another location in the RM 82, i.e., a pointer to another rule memory entry. If this field is 0, the entry contains information for performing a filter check. In this case, bits 11-0 contain an address of a row of CM 84 where operands for the check are to be found, and bits 35-12 contain encodings of operations to be performed on respective operands and fields from the request. These operations are described in more detail below. Bit 36 is a Carry bit used to form compound rules, for example to perform range checking. If the carry bit is zero, the rule is evaluated by itself. If the carry bit is one, the rule evaluates as true only if the next rule also evaluates as true. Bit 37 is a Done bit indicating that the last of a string of rules to be checked as part of a request has been reached.

The criterion operator field contains eight 3-bit logical operator codes. Each operator code specifies an operation to be performed on corresponding comparands selected from the request and the criterion memory entry. The fields of the criterion memory entry are described below. The assignment of criterion operator bits to comparands is as follows:

35–33 CM0 SA/DA field
32–30 CM1 Protocol field
29–27 CM1 Source Port field
26–24 CM1 SA/DA or DP field
23–21 CM2 Protocol field
20–18 CM2 TOS or TOS with mask field
17–15 CM2 Source port or Flags with mask field
14–12 CM2 SA/DA or SP or DP field The operator code specifies a comparison to be performed, where the comparand from the request is on the left of the operator and the comparand from the criterion memory entry is on the right. For example, if the operator is ">", then the expression evaluated is (request data>criterion data). The operator codes are as follows:

000 Greater than
001 Less than
010 Equal
011 Not Equal
1xx Don't care (i.e. force TRUE regardless of comparand values)

The criterion operators are used to configure logic within the comparison logic blocks 92, 94, and 96 in a manner described below.

FIG. 11 shows the structure of the entries in CM0 86 of FIG. 9. Each entry is 38 bits wide. A single bit, bit 37, is used to distinguish between two possible configurations for the entry, as either a 32-bit source address (SA) or a 32-bit destination address (DA). Bits 31–0 contain an SA or DA value as required by a corresponding filter. Bits 36–32 contain a 5-bit encoded mask value that is used to limit the extent of the comparison between the SA/DA in the entry and the SA/DA of the request. The use of the mask is described in more detail below.

FIG. 12 shows the structure of the entries in CM1 88 of FIG. 9. Each entry is 47 bits wide. Four different configurations are possible, as indicated. by bits 46–45. The PTCL field identifies an IP protocol in all four configurations. The 16-bit SP and DP fields in configurations 2 and 3 represent source port and destination port identifiers, respectively. The contents of bits 36–32 are undefined in configurations 2 and 3.

FIG. 13 shows the structure of the entries in CM2 90 of FIG. 9. Each entry is 51 bits wide. Eight different configurations are possible, as indicated by bits 50–48. The TOS field of configurations 2 through 7 identifies an IP Type of Service. In configurations 3 through 7, the TOS Mask field contains an 8-bit mask used to limit the extent of the TOS comparison, as described below. The 8-bit FLAGS field contains flag values to be compared against corresponding flag bits from TCP/UDP packets. The 8-bit FLGS MSK field is used to limit the extent of the FLAGS comparison, as described below.

Figure 14:
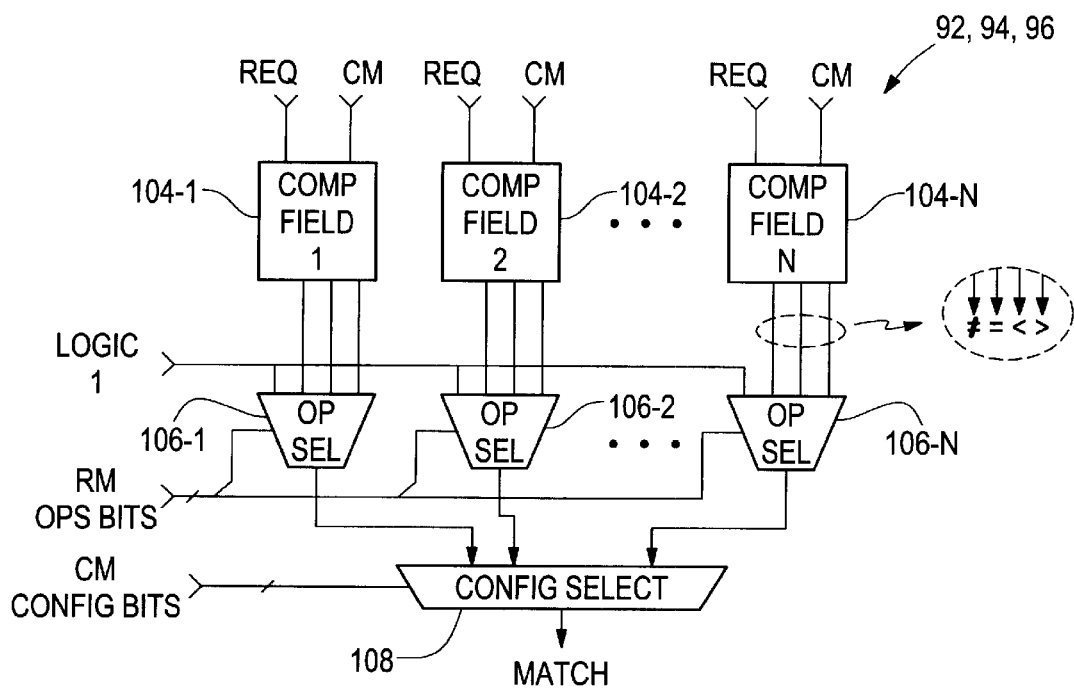
FIG. 14 is a block diagram of a comparison logic block for a bank of criterion memory in the packet classification engine of FIG. 9.

FIG. 14 shows the general structure of the comparison logic blocks 92, 94 and 96. Two or more blocks of comparator logic 104-1, . . . 104-n are used to perform multiple comparisons in parallel, where each comparison is between a given field of a request and a corresponding field of a criterion memory entry. In the comparison logic 92 for CM0 86, for example, two comparator logic blocks 104 are employed, one for the Source Address field of the request and one for the Destination Address field of the request. The comparison logic 94 for CM1 88 contains comparator logic blocks 104 for Source Address, Destination Address, IP Protocol, Source Port and Destination Port. The comparison logic 96 for CM2 90 contains comparator logic blocks 104 for Source Address, Destination Address, IP Protocol, Source Port, Destination Port, Type of Service without mask, Type of Service with mask, and Flags.

The outputs from the comparator logic blocks 104 include indications for NOT EQUAL (≠), EQUAL (=), LESS THAN (<) and GREATER THAN (>). These signals are provided to the inputs of respective selectors 106-1, . . . 106-n, along with a logic "1" which is used to implement a DON'T CARE function. The selectors 106 receive the operators from an operator-type rule memory entry as control inputs. These operators reside within bits 35–12 of the rule memory entry, as described above.

The respective outputs of the selectors 106 are provided to another selector 108, which selects from among different combinations of the outputs of the selectors 106 based on the configuration bits from the criterion memory entry. For example, in the comparison logic 92 for CM0, the configuration selector 108 selects between a SA comparison result and a DA comparison result based on the value of bit 37 of the criterion memory entry. The configuration selectors 108 in the other comparison logic blocks 94 and 96 operate similarly. The output signal MATCH from the configuration selector 108 indicates whether the data in the request satisfies the criteria from the respective criterion memory 86, 88 or 90. As shown in FIG. 9, the MATCH outputs from the comparison blocks 92, 94 and 96 are ANDed together by an AND gate 10, to provide a single MATCH indication to the addressing and control logic 98 for controlling the classification operation.

Figure 15:
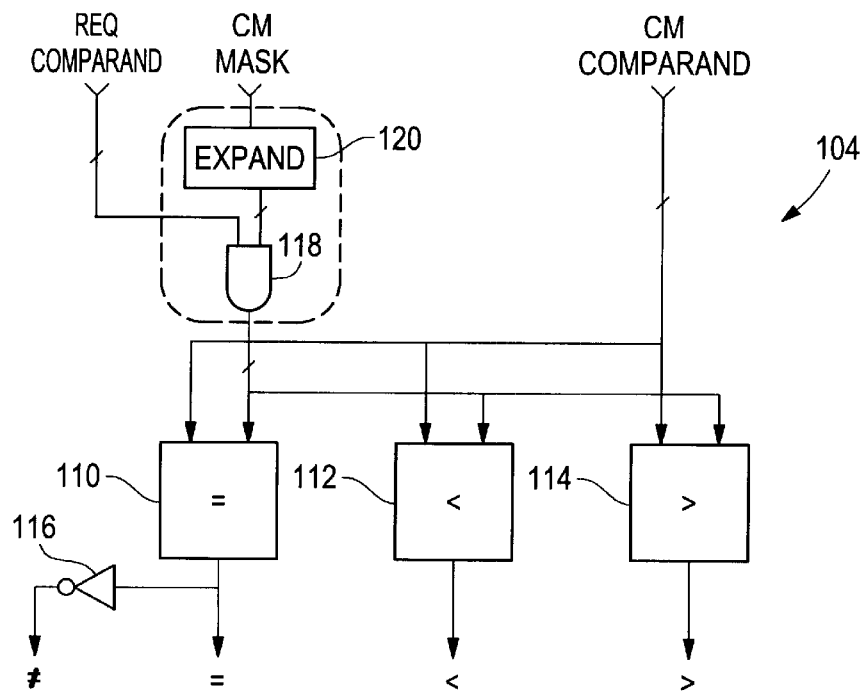
FIG. 15 is a block diagram of a comparator logic block used in the comparison logic block of FIG. 14.

FIG. 15 shows the general structure of a comparator logic block 104. An EQUAL comparator 110 determines whether two comparands are equal, a LESS THAN comparator 112 determines whether one of the comparands is less than the other comparand, and a GREATER THAN comparator 114 determines whether the one comparand is greater than the other comparand. The output from the EQUAL comparator 110 is inverted by an inverter 116 to obtain the NOT EQUAL indication.

The inputs to each comparator 110, 112, and 114 are a comparand from the CM 84 (shown as "CM comparand")

and a possibly masked comparand from the request (shown as REQ comparand). Masking logic is used for those fields having associated masks. AND gates 118 implement bit-by-bit masking. The multi-bit mask (shown as "CM mask") may be used directly, as in the case of the Flags Mask, or it may be decoded or expanded by expander logic 120, as in the case of the SA/DA Mask. The expander logic 120 generates a 32-bit value having zeroes in a number of trailing bit positions as indicated by the 5-bit encoded mask value, and ones elsewhere. For example, if the mask value is 01011 binary, which is equivalent to 11 decimal, the decoded mask is FFFFF800 hexadecimal, which has ones in the leading 21 positions and zeros in the trailing 11 positions. This mask indicates that only the most significant 21 bits of the SA/DA should affect the comparison result.

The operation of the packet classification engine (PCE) 76 proceeds generally as follows:

1. The RM 82 and the CM 84 are initialized by the IOP 26 of FIG. 2. This happens at power-up, and during operation either by dynamic assignment or by a Network Management Station (NMS) (discussed below).

2. A packet classification request submitted by the FP 58 is retrieved from the request queue 70 of FIG. 5.

3. The RM 82 is indexed by the contents of the root 0 address of the request to retrieve the first rule memory entry of the search. If the entry is a pointer type, then this step is repeated for the rule memory address in the retrieved entry. It is possible for this step to repeat multiple times.

4. If the retrieved rule memory entry is an operator type, then a criterion memory entry is retrieved at the location specified by the CM address in the rule memory entry. Selected comparands from the CM 84 are compared with corresponding fields of the request, according to the operator in the rule memory entry. Various fields may be masked as described above.

5. The rule memory address increments by one until either an entry having a DONE bit set to one is reached, or a match condition is found (i.e. the result of the comparison operation is TRUE). A rule may have its CARRY bit set, which requires that the next rule also evaluate as TRUE before a match is declared.

6. If any rule memory entry encountered in the search is a pointer type of entry, it points to another rule memory entry rather than to a criterion memory entry. In this case, sequential rule evaluation continues beginning at the pointed-to rule memory entry.

7. The above process is performed once beginning at the root 0 address in the request. If DONE is reached for the filters associated with root 0, then the process is repeated beginning at the root 1 address. When a match is found, the result indicates whether it has been found using root 0 or root 1 rules.

8. When the search terminates, either by encountering a match or by encountering DONE in the root 1 search, a result is written back to the result queue 72 indicating the results of the filtering check. The result contains the address of the last rule checked, and whether or not a match has been found. If a match has been found, the address is used by the FP 58 to index into an action table, which initiates an action appropriate to the result. For example, if the match is for a rule indicating that all packets having a DA of less than a certain value should be dropped, then the action table points to a routine that causes the packet to be intentionally discarded.

As described above, the CM 84 can be used in a variety of different configurations. Each of the three memories CM0 86, CM1 88 and CM2 90 can be used in different modes to realize the different configurations. The following truth table presents the different comparisons that can be performed using the different configuration modes of the criteria memories 86, 88 and 90. A "1" indicates that a comparison can be performed using a given configuration mode, and a "0" indicates that the comparison cannot be performed.

| CNFIG | SA & Mask | DA & Mask | PTCL | SP | DP | TOS | TOS & Mask | FLAG & Mask |
|---|---|---|---|---|---|---|---|---|
| CM0-0 | 1 | 0 | 0 | 0 | 0 | 0 | 0 | 0 |
| CM0-1 | 0 | 1 | 0 | 0 | 0 | 0 | 0 | 0 |
| CM1-0 | 1 | 0 | 1 | 0 | 0 | 0 | 0 | 0 |
| CM1-1 | 0 | 1 | 1 | 0 | 0 | 0 | 0 | 0 |
| CM1-2 | 0 | 0 | 1 | 1 | 1 | 0 | 0 | 0 |
| CM1-3 | 0 | 0 | 1 | 1 | 1 | 0 | 0 | 0 |
| CM2-0 | 1 | 0 | 1 | 0 | 0 | 0 | 0 | 0 |
| CM2-1 | 0 | 1 | 1 | 0 | 0 | 0 | 0 | 0 |
| CM2-2 | 0 | 0 | 1 | 1 | 1 | 1 | 0 | 0 |
| CM2-3 | 0 | 0 | 0 | 1 | 1 | 1 | 1 | 0 |
| CM2-4 | 0 | 0 | 0 | 0 | 1 | 1 | 1 | 1 |
| CM2-5 | 0 | 0 | 0 | 1 | 0 | 1 | 1 | 1 |
| CM2-6 | 0 | 0 | 0 | 1 | 0 | 1 | 1 | 1 |
| CM2-7 | 0 | 0 | 0 | 1 | 0 | 1 | 1 | 1 |

Thus for example, an SA comparison can be performed using any of CM0-0, CM1-0, and CM2-0. A FLAGS comparison can be performed using any of CM2-4 through CM2-7. The ability to perform a given comparison using any of a variety of configuration modes provides desirable flexibility in organizing CM 84, which in turn enhances efficiency. The allocation of criterion memory space is described in some detail below.

It may be possible in alternative embodiments to achieve greater storage efficiency by using different methods of encoding the criterion memory configuration information. It will be noted that in the illustrated embodiment, 30 bits are used to store the configuration memory for each criterion memory entry. These 30 bits include 24 bits of operator codes in a rule memory entry, 1 bit in a CM0 entry, 2 bits in a CM1 entry, and 3 bits in a CM2 entry. This scheme simplifies decoding within CM0, CM1 and CM2. However, it can be shown that the number of all possible configurations of comparands and operations for a criterion memory entry is on the order of $3.3 \times 10^6$, and can thus be represented using only 22 bits. Thus it may be possible, for example, to use a single 22 bit configuration field in each rule memory entry, from which the operator and comparand information is decoded. However, the decoding required in such embodiments are generally more complicated than in the illustrated embodiment, due to the lack of one-to-one correspondence between each configuration bit and a respective section of CM 84.

Figure 16:
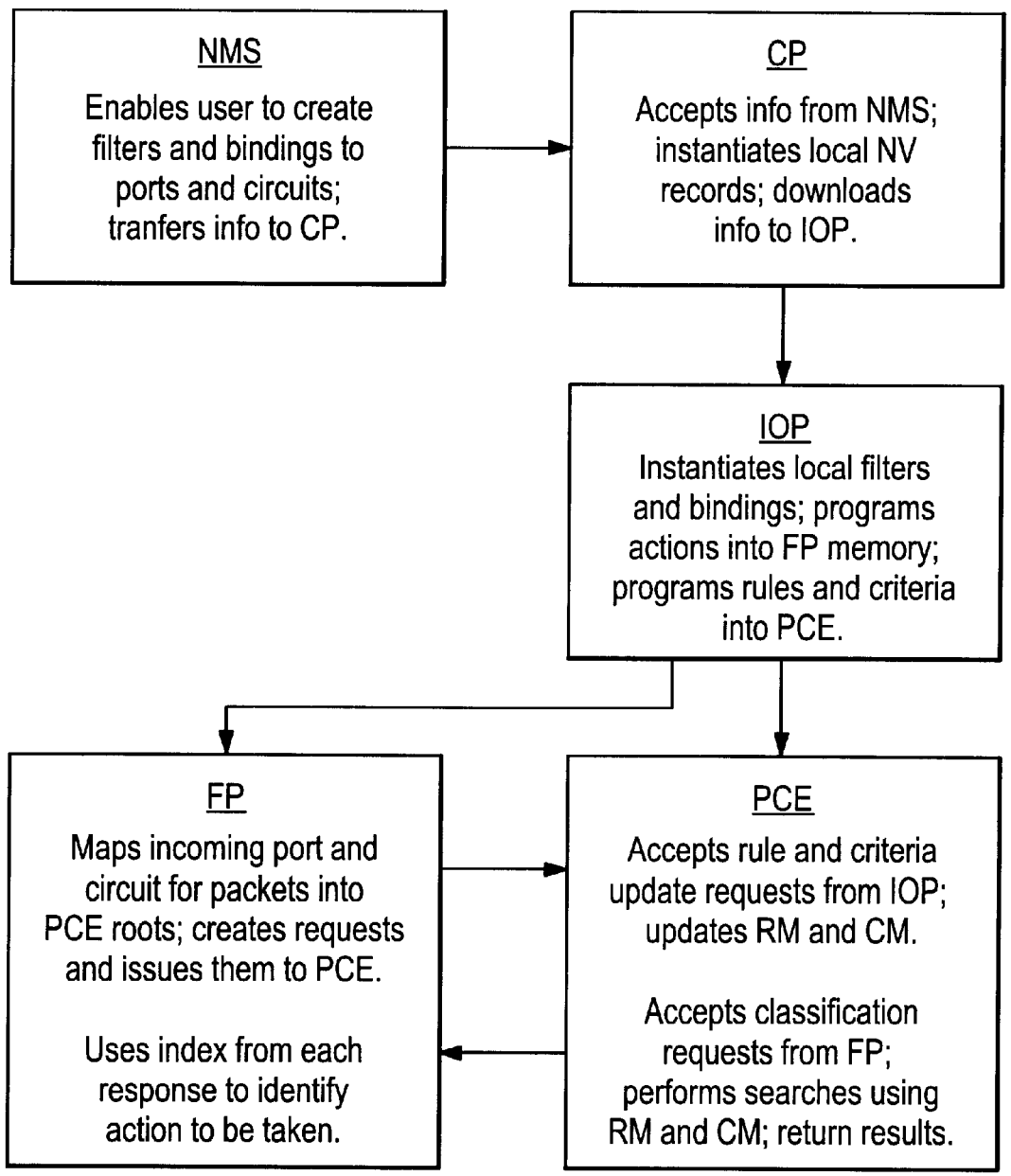
FIG. 16 is a diagram illustrating how packet filtering information is created, distributed, and used by different processing elements in the switch of FIG. 1.

FIG. 16 shows the manner in which packet filtering information is managed and utilized in the switch 10 of FIG. 1. Generally, the source of packet filtering information is a network management station (NMS), which is typically located apart from the switch 10 of FIG. 1. The NMS communicates with a central processor (CP) residing within the switch control 18 of FIG. 1 using a network management protocol such as Simple Network Management Protocol (SNMP). The CP receives the filtering information from the NMS, and is responsible for distributing it to the IOP 26 of each line interface 12. Additionally, the CP maintains the information in non-volatile (NV) storage, so that the switch 10 is able to operate during periods when the NMS may be unavailable.

The filter information sent from the CP to the IOP 26 includes (1) filters, each of which specifies up to a small number of criteria that can be applied to received packets, (2) bindings, that is, information associating different groups of the filters with different ports and/or circuits in the switch 10, and (3) actions, having associations with the filters, which are to be performed when filter criteria are satisfied.

In operation, when an IOP 26 is initialized, the CP retrieves an existing filtering table and binding database from the NV storage and downloads them to the IOP 26 of each line interface 12. When the NMS adds, deletes or modifies a filter or binding, it issues an SNMP action request to pass the new information to the CP. In turn, the CP posts the change to each IOP 26.

The IOP 26 receives the filtering information from the CP and instantiates local copies of the filters, bindings and actions into its memory. The IOP 26 updates these local copies whenever the CP sends new information. The IOP 26 programs the FP memory 60 in each forwarding engine 22 of FIG. 2 with a table of different actions that can be taken for the various filters. The IOP 26 also creates RM entries and CM entries corresponding to the filters and bindings, and programs the RM 82 and CM 84 (FIG. 9) of the PCE 76 (FIG. 5) with these entries. Whenever the IOP 26 receives new filtering information from the CP, RM and CM entries are deleted, added, or changed as necessary.

The FP 58 is responsible for processing packets with the assistance of the PCE 76. Using the information provided by the IOP 26, the FP 58 maps the port and circuit identities of each received packet into root 0 and root 1 addresses, creates a PCE request using these addresses, and writes the request to the PCE 76 via the request queue 70 (FIG. 5). As mentioned above, the FP 58 generally attempts to operate the PCE 76 in a batch fashion by writing a burst of multiple requests if possible. The PCE processes the requests in the manner described above. The FP 58 polls the PCE 76 to obtain results, which are returned by the PCE 76 in blocks as described above. For each result in which a match is indicated, the PCE match address from the result is used as an index into the action table established by the IOP 26 to ascertain which action to take for the packet. The FP 58 then performs the indicated action.

As previously mentioned, both the RM 82 and the CM 84 are relatively small memories implemented on a single IC in order to achieve high performance. It is important that the limited space in these memories be efficiently managed. The IOP 26 is responsible for the allocation of space in the CM 84 for filter criteria, and the allocation of space in the RM 82 for rule sets. These operations are described in turn below.

Filters may be one of two types, either stand-alone or compound. Stand-alone filters can be realized using only one rule. Compound filters require multiple rules. Although there can be different types of compound filters, the only compound filters employed in the illustrated embodiment are range filters. A range filter requires one rule to check for an upper bound of a range and another rule to check for a lower bound of the range. Thus, the first step in adding a filter is to determine whether the filter is a standalone filter or a range filter. If the filter is a standalone filter, only one criterion memory configuration is required, whereas two configurations are required for range filters. The contents of CM 84 are then searched and/or evaluated to determine how to best represent the filter in the CM 84. Once a configuration is chosen, the filter information is added as an update to the CM 84. These processes are described in more detail below.

There are many types of configurations of a criterion memory entry that can be used to realize a given filter. These are organized into seven CM configurations depending on which of the criterion memories 86, 88 and 90 are used. The following table shows several of the more commonly used configuration types, arranged according to CM configuration:

| TYPE | CM CONFIG | CM0 MODE | CM1 MODE | CM2 MODE |
| --- | --- | --- | --- | --- |
| 6 | (CM0, CM1, CM2) | 0:SA | 1:DA | 2:PTCL, SP, DP, TOS |
| 5_1 | (CM1, CM2) | | 0:SA | 2:PTCL, SP, DP, TOS |
| 5_2 | | | 1:DA | 2:PTCL, SP, DP, TOS |
| 5_3 | | | 0:SA | 1:DA, PTCL |
| 4_1 | (CM0, CM2) | 0:SA | | 2:PTCL, SP, DP, TOS |
| 4_2 | | 1:DA | | 2:PTCL, SP, DP, TOS |
| 4_3 | | 0:SA | | 1:DA, PTCL |
| 3_1 | (CM0, CM1) | 0:SA | 2:PTCL, SP, DP | |
| 3_2 | | 1:DA | 2:PTCL, SP, DP | |
| 3_3 | | 0:SA | 1:DA, PTCL | |
| 2_1 | (CM2) | | | 0:SA, PTCL |
| 2_2 | | | | 1:DA, PTCL |
| 2_3 | | | | 2:PTCL, SP, DP, TOS |
| 1_1 | (CM1) | | 0:SA, PTCL | |
| 1_2 | | | 1:DA, PTCL | |
| 1_3 | | | 2:PTCL, SP, DP | |
| 0_1 | (CM0) | 0:SA | | |
| 0_2 | | 1:DA | | |

The CM configurations are ranked from most expensive to least expensive in terms of resource consumption. For many filters, any of a variety of configurations may be used, but the goal is to use the least expensive, or "minimum", configuration in order to maximize the efficiency of memory use. For example, a filter needing only an (SA, SA Mask) comparison can be implemented using any CM configuration, and the minimum configuration is (CM0). As another example, a filter needing (SA, SP, and PTCL) can be implemented using any of the four configurations (CM0, CM1), (CM0, CM2), (CM1, CM2), and (CM0, CM1, CM2); the minimum configuration is (CM0, CM1).

The minimum configuration is used as the starting point in a search for the minimum available configuration. If the minimum configuration is available, then it is used. Otherwise, configurations that are successively more expensive are considered until an available one is found. In the above example, the configurations are searched in the following order: (CM0, CM1), (CM0, CM2), (CM1, CM2), and (CM0, CM1, CM2). The configuration search employs a collection of linked lists of free criterion memory locations, wherein each list represents a particular set of free columns in a single row, e.g. (CM0), (CM0, CM1), etc. Based on the type of comparisons required by the filter, the IOP 26 searches all eligible lists in a predetermined sequence looking for the first one with an available entry.

If the selected criterion memory configuration is larger than the minimum required configuration for a given filter, then the remainder portion is made available for use by other filters. Thus in the above example, if the configuration (CM0, CM1, CM2) is used when only (CM0, CM1) is required, then one unit of (CM2) is made available for use by other filters.

Once a configuration has been chosen, the various elements of the filters are allocated to the different sections of CM 84 as appropriate. Continuing with the example of a filter requiring (SA, SP, and PTCL), and assuming that the configuration (CM0, CM1) is chosen, then the SA and the SA Mask are allocated to CM0, and the SP and PTCL are allocated to CM1. This allocation corresponds to the configuration type 3_1 from the above table. CM0 86 is configured in mode 0, and CM1 88 is configured in mode 2. Once this allocation is complete, the entry (or entries for range filters) for CM 84 are generated (see FIG. 11–FIG. 13 and accompanying description) Also, the data for the criterion operators (bits 35–12) for a corresponding rule memory entry (see FIG. 10 and accompanying description) are also generated. The rest of the rule memory entry is generated during filter binding, discussed below.

When a filter is deleted, the CM configuration used for the deleted filter is made available for re-use. Available configurations are concatenated if possible to make larger configurations. These can be used later in whole or in part as described above. For example, if a unit of (CM0) is freed by deletion of a filter, and a unit of (CM1) is available in the same row of CM 84, then a unit of (CM0, CM1) is created.

As previously mentioned, the IOP 26 is also responsible for maintaining rule sets that represent "bindings" of filters, or associations between sets of one or more filters with logical ports or circuits. This process involves the allocation and programming of the RM 82. When a binding is to be added, the size of the binding to be added is first evaluated. The size is dictated by the number of filters used with the logical port or circuit, and the mixture of range filters and non-range filters. Once the size of the binding is known, space in the RM 82 is allocated. In the illustrated embodiment, rule memory space is allocated in segments whose sizes are powers of two. Free segments are maintained on respective free lists until allocated to a binding, and segments from deleted bindings are returned to the free lists for re-use. The segments are chained together using singly linked lists. For example, each free list is a singly linked list of non-allocated segments of the same size. Each binding is a singly linked list of generally different-size segments.

Consider a binding requiring 21 rule memory entries. For this binding, segments of sizes 16, 4, 2 and 2 are preferably allocated. The 16-entry segment stores 15 rules and a pointer to the 4-entry segment. The 4-entry segment stores three rules and a pointer to one of the 2-entry segments, which in turn stores one rule and a pointer to the other 2-entry segment. The last segment stores two rules. During allocation, if a segment of a desired size is not available, a larger segment is utilized. Unused space in a segment can simply remain unused, or alternatively can be made available for allocation to other bindings, in a manner similar to that discussed above for allocation of criterion memory configurations.

Once the memory allocation is complete, the entries for the RM 82 are created and written into the RM 82. During this process, each operator type rule is programmed with the address of the corresponding criterion memory entry that should be used with the rule, and the operators are programmed with appropriate values based on the filter represented by the rule/criteria pair. The rules are arranged in logical sequence in the RM 82 in accordance with the desired sequence in which the filters should be checked. Within a segment of RM 82, the rules are arranged sequentially. For bindings spanning multiple segments, the segments are chained together such that the rules are evaluated in the desired sequence.

Various apparatus and methods related to packet classification have been described. Although the present invention has been described primarily with reference to Internet Protocol (IP) packets or messages, it will be apparent that the techniques described may be used for other types of messages. It will also be apparent to those skilled in the art that other modifications to and variations of the above-described technique are possible without departing from the inventive concepts disclosed herein. Accordingly, the invention should be viewed as limited solely by the scope and spirit of the appended claims.

What is claimed is:

1. Packet classification apparatus, comprising:
   input interface logic operative to receive a packet classification request including information from a packet being processed by a packet classification requester;
   a rule memory operative to store rule memory entries, each rule memory entry containing an operator and a criterion memory pointer;
   a criterion memory operative to store criterion memory entries, each criterion memory entry containing a criterion;
   output interface logic operative to provide a packet classification result to the packet classification requestor; and
   control logic operative in response to the received packet classification request to:
   (i) retrieve a rule memory entry from the rule memory;
   (ii) retrieve a criterion memory entry from the criterion memory at a location specified by the criterion memory pointer in the retrieved rule memory entry;
   (iii) perform an operation specified by the operator in the retrieved rule memory entry, the operation being carried out on the packet information from the packet classification request and the criterion from the retrieved criterion memory entry; and (iv) generate a packet classification result reflecting the result of performing the operation.

2. Packet classification apparatus according to claim 1, wherein:

the rule memory is operative to store both first-type and second-type rule memory entries, each first-type rule memory entry containing an operator and a criterion memory pointer, and each second-type rule memory entry containing a rule memory pointer; and the control logic is operative in response to the received packet classification request to:

(i) determine whether the retrieved rule memory entry is a first-type entry or a second-type entry;

(ii) retrieve the criterion memory entry and perform the specified operation if the retrieved rule memory entry is a first-type entry;

(iii) if the retrieved rule memory entry is a second-type entry, then retrieve another rule memory entry at a location specified by the rule memory pointer contained in the second-type entry, and repeat the preceding steps for the newly retrieved rule memory entry; and (iv) generate a packet classification result reflecting the results of performing the respective operations specified by all retrieved first-type entries.

3. Packet classification apparatus according to claim 1, wherein the control logic is further operative to repeat steps (i)–(iii) for additional rule memory entries until an indication of completion is reached.

4. Packet classification apparatus according to claim 3, wherein the indication of completion is an asserted DONE bit in a retrieved rule memory entry.

5. Packet classification apparatus according to claim 3, wherein the indication of completion is the satisfaction of a condition specified by the operator in a retrieved rule memory entry.

6. Packet classification apparatus according to claim 3, wherein the additional rule memory entries are retrieved by sequentially accessing successive locations in the rule memory.

7. Packet classification apparatus according to claim 3, wherein the additional rule memory entries are retrieved by accessing locations specified in rule memory pointers contained in retrieved rule memory entries.

8. Packet classification apparatus according to claim 1, wherein the control logic is operative to retrieve the rule memory entry based on a rule memory address included in the received packet classification request.

9. Packet classification apparatus according to claim 1, wherein the rule memory entry retrieved by the control logic is a first rule memory entry, the control logic being operative to select the first rule memory entry based on a first rule memory address included in the received packet classification request, and wherein the control logic is further operative to select a second rule memory entry based on a second rule memory address also included in the received packet classification request, and to repeat steps (i)–(iii) for the second rule memory entry.

10. Packet classification apparatus according to claim 1, wherein the rule memory entry contains a CARRY indicator indicating whether the rule memory entry is a first rule memory entry forming a compound rule with a second rule memory entry, and wherein the control logic is operative to repeat steps (i)–(iii) for the second rule memory entry and to generate the packet classification result in step (iv) such that the packet classification result reflects the results of the operations for both the first and second rule memory entries.

11. Packet classification apparatus according to claim 1, wherein the criterion in the criterion memory entry and the information in the request are network addresses.

12. Packet classification apparatus according to claim 11, wherein the addresses are destination addresses.

13. Packet classification apparatus according to claim 1, wherein each criterion memory entry contains configuration information indicating a manner in which the criterion memory entry is configured, and the control logic is operative to (i) interpret the configuration information of the retrieved criterion memory entry to determine which of multiple fields in the criterion memory entry are to be used in the operation, and (ii) perform the operation using only the appropriate fields of the criterion memory and corresponding information from the packet classification request based on the determined configuration.

14. Packet classification apparatus according to claim 1, wherein each criterion memory entry contains configuration information indicating a manner in which the criterion memory entry is configured, and the control logic is operative to (i) interpret the configuration information of the retrieved criterion memory entry to determine which information from the packet classification request is to be used in the operation, and (ii) perform the operation using only the appropriate information from the packet classification request and corresponding information in the criterion memory entry based on the determined configuration.

15. Packet classification apparatus according to claim 1, wherein the criterion memory is organized into major divisions such that each criterion memory entry includes different fields associated respectively with the different major divisions, each field being configurable to hold different types of criteria according to configuration information contained in the criterion memory entry, and wherein the control logic is operative for each major division to select information from the packet classification request for use in the operation with the respective field of the criterion memory entry based on the configuration information contained in the criterion memory entry.

16. Packet classification apparatus according to claim 15, wherein the criterion memory includes three major divisions such that each criterion memory entry contains a first field configurable as either a source or destination address, a second field configurable as either a source address, a destination address, or as a set of port identifier information, and a third field configurable as either a source address, destination address, a set of port identifier information, or a set of flag information.

17. A method of managing space in a set of criterion memories used to hold search criteria in a hardware search engine, comprising:

maintaining an ordering of different configurations of the criterion memories, the configurations being ordered according to the total amount of criterion memory storage space required to store criterion memory entries using the respective configuration;

maintaining a set of lists indicating the availability of space in the criterion memory for storing criterion memory entries according to the different configurations;

determining, for a given search to be performed, which of the configurations is a minimum configuration requiring the minimum amount of criterion memory storage space to store a criterion memory entry required for the search;

searching for a minimum available configuration as indicated by the lists, the searching beginning with the minimum configuration and proceeding in the order of increasing consumption of criterion memory space until the first available configuration is found; and allocating the minimum available configuration to store the criterion memory entry required for the search, and updating the availability lists to indicate that the allocated configuration is no longer available.

18. A method according to claim 17, further comprising determining, if a configuration other than the minimum configuration is allocated, whether an unneeded portion of the allocated configuration can be used as a different configuration allocable to another criterion memory entry, and further comprising updating the availability lists to indicate the availability of the different configuration.

* * * * *